Patented Apr. 3, 1934

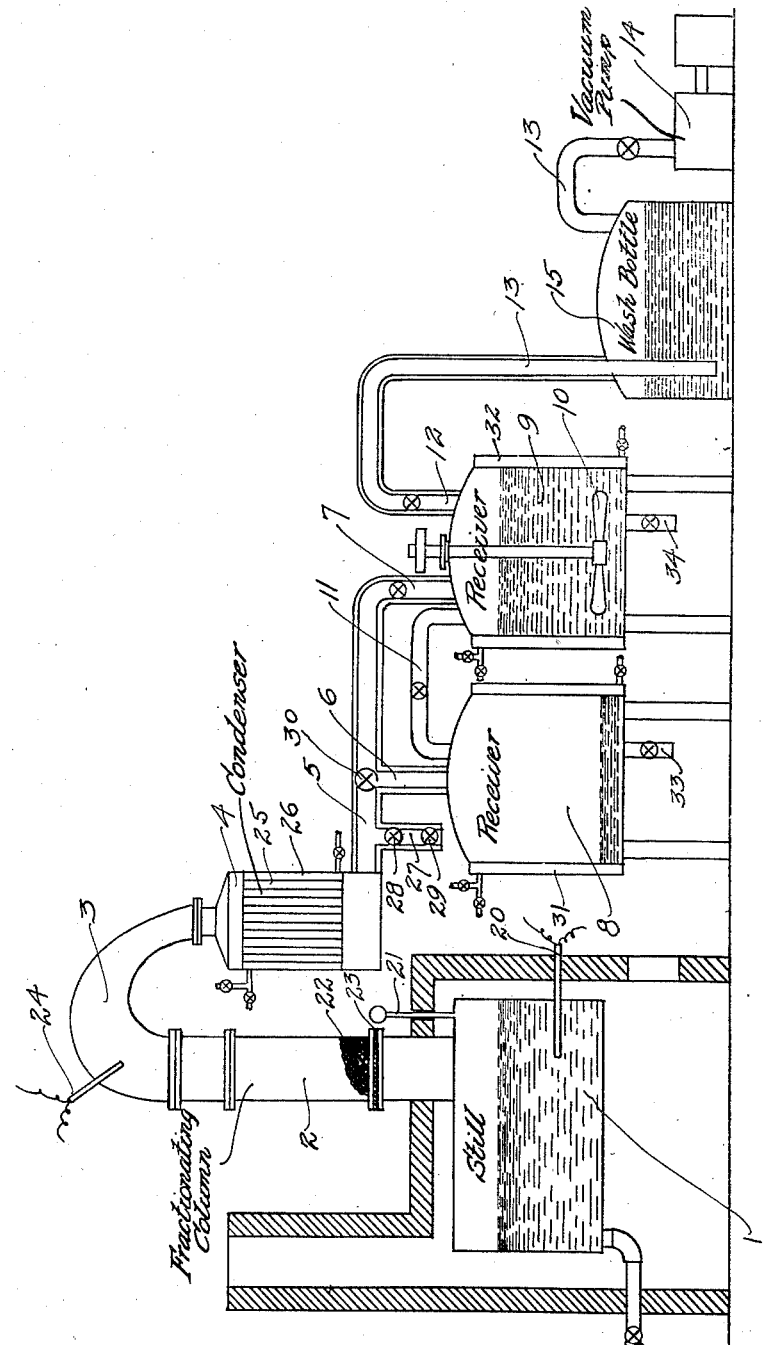

1,953,070

UNITED STATES PATENT OFFICE 1,953,070

PURIFICATION OF CHLORNAPHTHALENES

Sandford Brown, Montclair, and Ernest R. Hanson, Bloomfield, N. J., assignors to Halowax Corporation, New York, N. Y., a corporation of Delaware Application October 19, 1928, Serial No. 313,621

5 Claims. (Cl. 260—161)

This invention relates to the manufacture and purification of chlorinated naphthalenes, and the obtaining of products therefrom having new and useful properties as hereinafter set forth.

Chlorine substitution products of naphthalene are obtained by passing chlorine gas through naphthalene while in a molten or liquid condition; this is described in United States Patent No. 914,223 issued to Aylsworth March 2, 1909. The crude product so obtained is a mixture of a number of chlorine compounds of naphthalene, together with certain objectionable impurities, and as such has limited commercial value. Fractionation and further purification steps have been found necessary in order to obtain useful products therefrom.

Fractional distillation of these products has been conducted heretofore under substantially atmospheric pressure. Several reasons have prevailed for so doing. One is the decided tendency of certain constituents often present in the crude toward dissociation or breaking down abruptly into volatile compounds, sometimes with explosive violence, during distillation, yielding among other substances hydrochloric acid gas. Another reason is the fact that complete condensation of the wax-like or higher chlorinated naphthalene vapors was found to be a difficult matter and solidification by submergence of the exit of the system in water, which permitted easy escape of suddenly evolved vapors, was adopted as the most practical means of capturing these vapors. These and other reasons led to the conclusion that a closed distillation system was to be avoided, and on this account operation under atmospheric conditions permitting free vent to any suddenly liberated vapors was regarded as practically necessary.

However, it was found that fractions so obtained could not be controlled within such precise limits as to afford products possessing, without further treatment, sufficiently well-defined properties to be available for the special technical uses for which they were intended. One factor contributing to this result was the impossibility of close temperature regulation of the still, a control within ten degrees being regarded as very good. Another factor was the carbon formation occurring in the still, which carbon not only deposited on the still bottom thus to interfere with heating, but was partially entrained with the vapors and could not readily be eliminated from the condensed fractions. A third factor was the contamination with water which was trapped in the lumps as they solidified in the water. These several factors caused such variations in the electrical characteristics of the wax-like products, for example, that they could not be relied upon in the manufacture of insulation for radio-condensers and similar articles, where tolerances were small.

The present invention is in part directed to a process of separation into fractions whereby, for example, wax-like chlorinated naphthalene products can be directly obtained with uniform chemical, electrical, and other physical characteristics, of high chemical purity and constant composition, free from water, and having a low acid number.

This improved process comprises in general fractional distillation of the crude chlorinated products under sufficiently reduced pressure, contrary to the prior practice and in contravention to the conclusions heretofore held on account of the nature of the materials treated.

In order that the invention may be more fully understood, attention is directed to the accompanying drawing illustrating one manner of practising the process for the distillation of crude chlorinated naphthalene and in which the figure represents diagrammatically a side elevation of an apparatus for carrying out a distillation and condensation under reduced pressure.

Referring to the drawing, a still 1 is therein indicated from which extends a fractionating column 2. A goose neck 3 connects the upper end of the column with a condenser 4. A delivery pipe 5 with branches 6 and 7 extends from the condenser to receivers 8 and 9, the latter being provided with an agitator 10. A separate pipe 11 also connects the receivers. An outlet 12 in the last receiver is connected by a line 13 to a vacuum pump 14. One or more wash bottles 15 can be included in the line to the pump.

The still 1 is illustrated as externally heated by an oil burner or other suitable means and it is provided with a pyrometer 20 and pressure gage or manometer 21. The fractionating column 2 is filled with Raschig rings 22 resting on a perforated plate 23; coke or other suitable material can be substituted for the rings and, if necessary, the column can be jacketed or otherwise provided with temperature regulating means. A pyrometer 24 is inserted at the top of the fractionating column. The condenser 4 is shown as of the tubular type with tubes 25 enclosed in a jacket 26 to which either steam or water can be admitted as a cooling medium. A sampling tap 27 is connected to the condenser outlet controlled by valves 28 and 29 to avoid destroying the partial vacuum under which the system operates and a three-way valve 30 controls the flow of condensate to either of the receivers 8 or 9. The receivers are provided with jackets 31, 32 with connections for steam or water, and the delivery pipe 5 with its branches and the line 13 are likewise jacketed. Drains 35 and 34 are provided for the receivers.

When a chlorinated naphthalene cut comprising principally the wax-like products suitable for electrical insulation is desired, a crude product is made by passing chlorine through naphthalene in a molten condition until its specific gravity is about 1.41 to 1.43 at 150° C. The crude product is treated with lime, barium oxide, sodium hydroxide or other basic material to neutralize the acidity and furthermore to aid in the elimination or breaking up of unstable addition products, as described in United States Patent No. 1,196,505 issued to Aylsworth August 29, 1916; generally about 1 to 2 per cent is sufficient. The still is charged with the treated product and heat is applied externally or internally. The vacuum pump is started and when the pressure in the still is reduced to about 4 to 6 inches of mercury absolute pressure, in other words a pressure reduction corresponding to about 24 to 26 inches of mercury is established, the charge begins to distill over at about 200° C. The first fraction is principally an oily product and this is collected in the first receiver 8. When the temperature has risen to about 225° C. or so, the first receiver is cut out and the condensate is collected in the second receiver 9. This collection is continued with a gradual increase in the temperature until it reaches about 250° C., whereupon the heat is withdrawn. These temperatures will of course vary with the particular charge and the particular cut desired, also with the degree of vacuum obtained. Toward the end of the distillation the partial vacuum registered by the pressure gauge increases to about 27 inches or higher. The first fraction may be submitted to rechlorination, while the second fraction contains the more desirable product suitable for superior technical uses. The high melting residue or pitch remaining in the still is drawn off before a new charge is supplied.

During the distillation, samples of the condensate are drawn off at intervals and the melting points and other properties determined; this serves as a check. The purifying operation when conducted under sufficiently reduced pressure as above described is, however, surprisingly amenable to close regulation, and the temperatures can be held within one degree fluctuation if so desired. The low temperatures available, as compared with 275 to 375° C. under atmospheric operation, avoid exterior oxidation of the metal of the still and gradual destruction thereof. There is furthermore an absence of any tendency to breaking down or destructive distillation of the ingredients accompanied by formation of free carbon, hydrochloric acid, or other disturbing substances. No water in the receiver is required to secure complete condensation and anhydrous products are consequently obtained.

Depending upon the percentage of the charge that is collected, a product is obtained that has a melting point varying within a range of 75 to 120° C. and a chlorine content of from 40 to 60 per cent. As the cut is more closely defined, the purity of the product is increased.

For condenser insulation purposes it is desirable that the melting points fall within the range of 88° to about 93° C.; and even with this narrow range, about 90 per cent of the charge can be recovered from the crude material by the present process, while under atmospheric distillation the highest recovery has been about 70% of the charge. This present cut, when applied to paper, yields an insulation that has a power factor varying from about .04 to 1.0 and a dielectric strength of about 3000 to 4000 volts A. C. per mil, which is about 20 per cent better than a paper impregnated with the product obtainable by distillation under atmospheric conditions. With special care even better results are possible. The products can be freely handled without any irritating effect on the skin or other injurious effects, which is not the case with products distilled at atmospheric pressure. Further refinement is of course possible by repeating the distillation under partial vacuum to obtain particularly pure compounds.

By the phrases "reduced pressure" and "partial vacuum" occurring in the claims is meant a low pressure or vacuum, materially below atmospheric pressure, so that the reduced pressure or vacuum enables the crude chlorinated product to be distilled at such a low temperature and with the application of such a small amount of heat that a pure product substantially uncontaminated by the halogen acid, for instance hydrochloric acid, and/or carbon, is condensed.

We claim:

1. A chlorine substitution product of naphthalene having a wax-like consistency and a melting range of substantially 88–93° C., said product being substantially neutral and having a dielectric strength, when applied to paper, of about 3000–4000 volts A. C. per mil.

2. A process of obtaining purified chlorine substitution products of naphthalene which comprises fractionally distilling a crude chlorinated naphthalene product having a specific gravity of about 1.41 to 1.43 at 150° C., and collecting the fraction corresponding to that distilling over a temperature range of 225 to 250° C. under 4 to 6" absolute pressure.

3. A process of obtaining purified chlorine substitution products of naphthalene which comprises fractionally distilling a crude chlorinated naphthalene product, regulating the temperature of fractionation, and collecting the fraction corresponding to that distilling over a range of 225 to 250° C. under 4 to 6" absolute pressure.

4. The hereindescribed wax-like chlorine substitution product of naphthalene such as may be obtained by fractionally distilling a crude chlorinated naphthalene product having a specific gravity of 1.41 to 1.43 at 150° C. and having a composition corresponding to the distillate obtained by distilling said crude product over a temperature range from substantially 225° C. to 250° C., under substantially 4 to substantially 6 inches of mercury absolute pressure.

5. Process of obtaining purified chlorine substitution products of naphthalene which comprises fractionally distilling a crude chlorinated naphthalene under reduced pressure and collecting the fraction corresponding to that distilling within temperatures ranging from 200 to 250° C. when subjected to an absolute pressure of six inches of mercury or less.

SANDFORD BROWN.
ERNEST R. HANSON.